Jan. 19, 1965     R. C. PUYDAK     3,166,466
FIBROUS CELLULOSIC PRODUCTS
Filed June 28, 1962
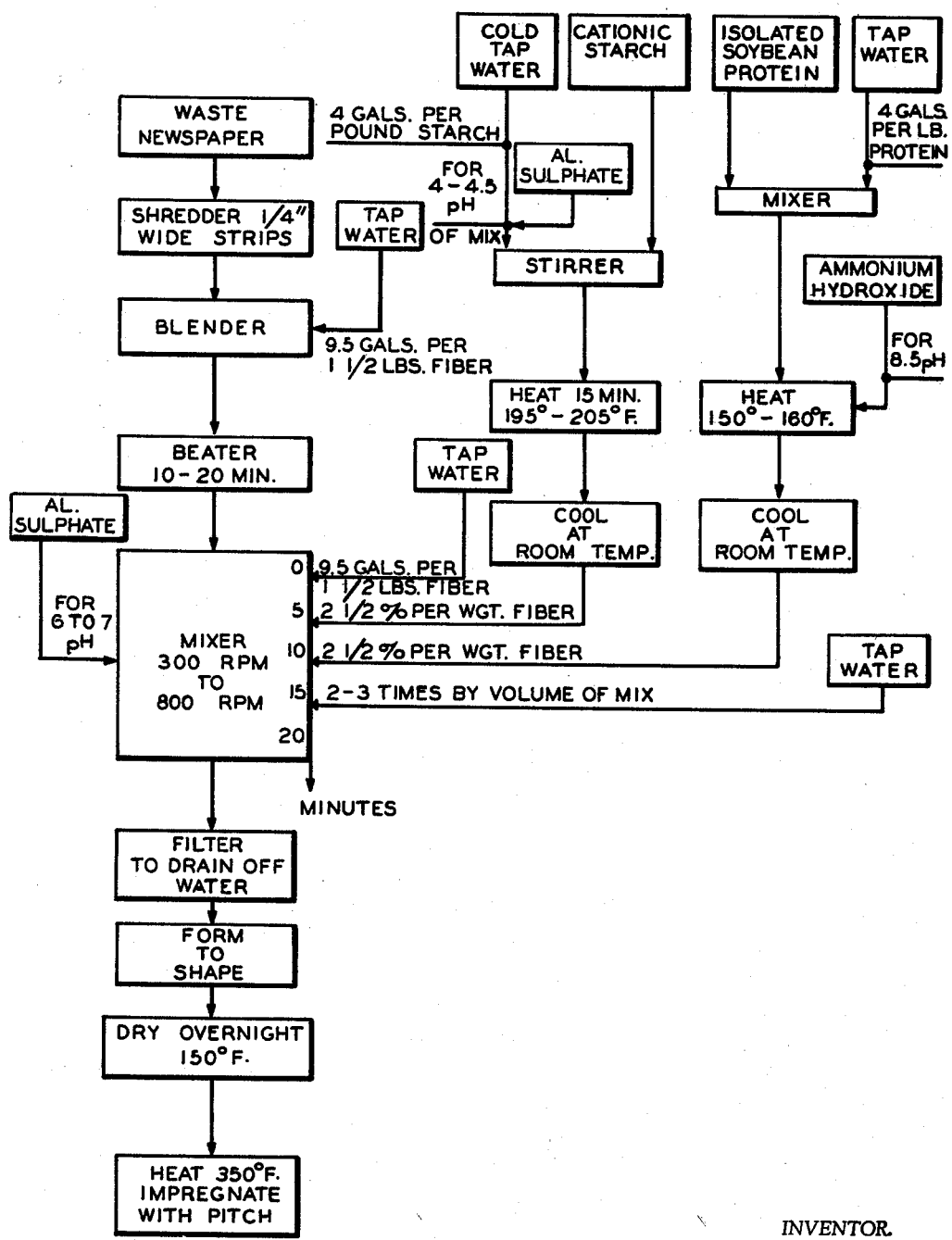
INVENTOR.
ROBERT C. PUYDAK
BY
George H. Fritzinger
AGENT

3,166,466
FIBROUS CELLULOSIC PRODUCTS
Robert C. Puydak, West Orange, N.J., assignor to McGraw-Edison Company, Elgin, Ill., a corporation of Delaware
Filed June 28, 1962, Ser. No. 205,869
8 Claims. (Cl. 162—135)

This invention relates to improved wood fibrous products and to improved methods of producing the same. In particular, the invention relates to a pipe or conduit of improved construction made from newspaper pulp and impregnated with a sealing material such as of pitch.

An object of the invention is to provide a wood fiber pulp of novel composition from which pipes, sheets, etc. can be produced having increased dry and wet strength and increased rigidity.

Another object is to provide a simple an economical method of producing such improved wood fiber pulp.

It has been known that starches increase the strength of paper products and that cationic starch is beneficial not only in increasing tensile strength but also in retaining fines and inorganic fillers as well as in providing greater uniformity and better internal sizing. However, much of the added strength from the starch is lost when such paper products are heated to the necessary temperature— i.e., 350° F.—to impregnate the same with pitch.

It is also known that some beneficial properties are obtained when protein is added to paper stocks. However, the protein has been heretofore added with a suitable acid to precipitate the protein on the fibers and the acid in turn has caused the heat resistance of the end product to be reduced with the result that the additional strength from the protein addiment is largely lost when the end product is heated to impregnate it with a sealing material.

The present invention resides in the discovery that when both cationic starch and protein are added to a paper pulp slurry the end product as when formed into a paper tube has an improved strength against crushing under both wet and dry conditions, which is not only maintained but even rendered more permanent by the heating involved in impregnating the tube with a sealing material.

The invention is herein described in connection with a flow diagram shown by the accompanying drawing.

In carrying out the invention a pulp slurry is made as from waste newspapers. The source of the paper stock is not important but general indications are that inherently weak paper stock is aided more by the invention than is inherently stronger paper stock. The paper is shredded as into one-quarter inch wide strips and then soaked in water at room temperature. Ordinary tap water is generally satisfactory. The quantity of water added may be in the ratio of about 9.5 gallons to from one to one and one-half pounds of dry shredded paper. In preparing the slurry the paper and water are added slowly to a blender and are beaten at a high speed at from ten to twenty minutes. Different known methods of beating the paper pulp and water into a slurry may be employed either to increase the amount of fibrillation of the fibers or to cut the fibers and increase the percentage of fines, depending upon the particular properties desired in the end product.

After the slurry is so prepared it is diluted by adding an additional equal quantity of water or more. As the slurry is stirred vigorously there are added solutions of cationic starch and protein prepared in the following manner:

The cationic starch solution is prepared using, for example, Cato 8, a trademarked product of National Starch and Chemical Corporation, New York, N.Y. This is an amine modified starch ether derivative in which the parent starch has been modified so that its molecules and molecular aggregate are cations carrying a positive charge. The starch derivative is added to cold water in the ratio of about four gallons of water to one pound of starch. As the starch is added to the cold water the mixture is stirred constantly. The dispersion is then heated to 195° F. to 205° F. and held at this temperature for fifteen minutes. During this heating the starch granules swell and burst causing the viscosity to increase greatly and then to drop. The pH of the dispersion will normally be from 4.0 to 4.5. If the pH is higher it is due to the chemicals in the tap water. In such event it is necessary that an acid or acid salt such as acetic acid, dilute hydrochloric acid or paper makers alum (aluminum sulphate) be added to the water before the starch is added.

The protein is isolated from soybeans and is in a powder form known in the trade as Adpro 410, a product of Archer-Daniels-Midland of Minneapolis, Minnesota. Preferably, this isolated soybean protein is mixed with water in the ratio of about one pound of protein to four gallons of water, and is then heated from 150° F. to 160° F. During the heating the pH is brought to about 8.5 by adding ammonium hydroxide. The solution is then preferably left to cool before it is mixed in the paper slurry.

As an alternative and faster method of preparing the protein solution, the protein may be dispersed in water at approximately 180° F., and then sufficient ammonia may be added to bring the pH to 8 to dissolve the protein.

The starch and protein may be added separately in the sequence here named to the paper pulp slurry or alternatively they may be first mixed together and then added to the slurry. During the addition process the slurry is mixed constantly to obtain even distribution of the addiments onto the fibers so that maximum strength will be obtained in the end product. After the starch and protein have been added the slurry may be further diluted by two to three times the volume with additional water and is stirred further for about five minutes to obtain good distribution and contact of the addiments onto the fibers. During the mixing of the addiments the pH of the slurry is preferably maintained between 6 and 7 by adding a solution of a papermakers' alum. The amount of alum necessary to maintain the pH of the slurry in this range will depend upon the chemicals in the particular tap water used. The advantage of holding the pH of the slurry in this range is that it enables the improved strength imparted by the addiments to be maintained when the end product is heated to the impregnating temperature of 350° F. For example, when the pH is below 6 the loss of strength from heating is great, and when the pH is above 8 the maximum strength prior to heating is low and the end product is also highly water absorptive.

Preferably, after the starch and protein additives are prepared they are cooled to room temperature before they are added to the paper slurry although the temperature of the additives is not critical. The rate of mixing the starch and protein additives into the paper slurry is however of considerable importance. For example, the slurry may be mixed for five minutes after the addition of the starch and may be mixed five minutes after addition of the protein, and may then be further mixed for five minutes after it is further diluted. When with a laboratory scale mixing apparatus the stirring is done at a rate of 300 r.p.m. the tensile strength of the end product is low. Upon increasing the stirring speed to 700 r.p.m. a maximum tensile strength is obtained and upon further increasing the stirring speed to 800 to 900 r.p.m. the tensile strength falls abruptly.

The failure to obtain maximum strength at a stirring rate of 300 r.p.m. appears to be due to insufficient mixing of the addiments with the paper fibers. On the other hand, when the mixing is at too great a speed, as at 800 to 900 r.p.m., there is an apparent increase in exposure of fiber surfaces indicated by a decrease in freeness with resultant decrease in coating of the fibers by protein and there is an apparent lack of build-up of agglomeration of starch and protein to impart strength to the inter-fiber mix.

There appears to be no advantage in adding protein in any greater percentage than that of the starch. Preferably, the starch and protein are each added in percentages from one and one-half percent to about three and one-half percent by weight of the fibers with best overall results being obtained generally when the percentage of each addition is around two and one-half percent. In processing the paper pulp slurry with the addiments into an end product, the same is drained of water as over a suitable filter and with a water aspirator, is then formed to shape, and then dried overnight at 150° in a forced circulating oven, after which it is heated and impregnated with pitch.

Tests have shown that the starch and protein addiments cause the dry strength of the end product to be increased by about eighty percent on the average and that these addiments increase the wet strength on the average by about sixty percent. The increase in cost by using the addiments is very small, being only of the order of 0.7 cent per foot of a pipe of four inch diameter when two and one-half percent of each addiment is used and only 0.4 cent per foot of such pipe when one and one-half percent of each addiment is used. Moreover, the only additional equipment in carrying out the invention comprises two tanks equipped with mixers and source of heat for preparing the starch and protein solutions, together with suitable pumps and piping for transferring the solutions to the fiber slurry. The production process therefore of carrying out the invention is a very economical one.

A particular advantage of adding the protein in combination with the cationic starch is that the protein enables the inherent strength giving properties of the starch to be maintained during the heating process necessary to impregnate the end product with pitch.

The theory of operation of the starch and protein addiments is not definitely known but it appears that these substances are absorbed onto the fibers by a combination of ionic and hydrogen bonds and enter into the system of inter-fiber bonds formed during drying, with the result that the strength is substantially increased. More specifically, it appears that the cationic starch makes possible a high degree of retention of the negatively charged protein particles by the negatively charged fiber surfaces by virtue of the starch being positively charged, with the result that the protein is enabled to contribute substantially to the strength of the fiber matrix. This is believed to be achieved by increasing the number of possible sites at which the protein molecules can form hydrogen and other chemical bonds linking it to the system of cellulose fibers and starch. In this case the heat treatment necessary for impregnating the fiber pipe or other fiber product appears to convert the hydrogen bonds between the cellulose, starch, and protein into chemical bonds of a more permanent nature. As a result, the improved product of the invention has not only a greater strength but also a greater durability and life.

The specific description of my invention herein given is intended to be illustrative and not necessarily limitative of my invention since the same is subject to changes and modifications without departure from the scope of my invention, which I endeavor to express according to the following claims.

I claim:
1. A wood fiber product comprising a mixture of dried wood fiber pulp, cationic starch and soybean protein, the quantities of said starch and protein being each from one and one-half precent to three and one-half percent by weight of said fiber.
2. A wood fiber product comprising a mixture of dried wood fiber pulp, cationic starch and soybean protein, the quantities of said starch and protein being each approximately two and one-half percent by weight of said fiber.
3. A water imprevious wood fiber product comprising an intimate mixture of dried wood fiber pulp, cationic starch and soybean protein formed into a shaped product and impregnated under a heated condition with pitch, said starch and protein being each present in a quantity which is from one and one-half percent to three and one-half percent by weight of said wood fiber pulp.
4. A wood fiber mixture adapted for producing shaped wood fiber products comprising a slurry of wood fiber pulp and water, said slurry containing in intimate mixture aqueous dispersions of cationic starch and soybean protein, said starch and protein being each present in quantities of from one and one-half percent to three and one-half percent by weight of said wood fiber.
5. The method of producing an aqueous wood fiber mixture adapted as a base product for producing shaped wood fiber products which comprises beating a shredded mass of wood fiber into water to form a slurry; preparing a cationic starch solution by adding cationic starch to water containing an acid in an amount to give the solution a pH of 4.0 to 4.5, and heating the solution to approximately 200° F. while stirring the same; preparing a protein solution by adding soybean protein extract to water, heating the solution from approximately 150° F. to 185° F. while stirring the same and adding ammonium hydroxide to give the solution a pH of approximately 8; and adding said starch and protein solutions to said slurry while stirring said slurry at a speed from 300 r.p.m. to 800 r.p.m.
6. The method set forth in claim 5 which comprises maintaining the pH of said slurry between 6 and 7 as the starch and protein solutions are added thereto.
7. The method set forth in claim 5 wherein dry wood fiber stock is initially added to water in the ratio of the order of one to one and one-half pounds wood fiber to ten gallons of water, said wood fiber and water are fed gradually into contact with each other and beaten from five to fifteen minutes, said slurry is then diluted by adding at least another equal quantity of water and is then further beaten, and wherein after adding said starch and protein solutions the slurry is mixed at least for five minutes.
8. The method set forth in claim 5 wherein in the preparation of said starch solution one pound of starch is mixed with approximately four gallons of water and the starch dispersion is cooked at least fifteen minutes, and wherein in the preparation of said protein solution one pound of soybean protein extract is mixed with approximately four gallons of water.

References Cited in the file of this patent
UNITED STATES PATENTS

| | | |
|---|---|---|
| 1,622,496 | Davidson et al. | Mar. 29, 1927 |
| 2,293,466 | Juhasz | Aug. 18, 1942 |
| 2,935,436 | Caldwell et al. | May 3, 1960 |